(12) United States Patent
Gibson et al.

(10) Patent No.: US 9,108,627 B2
(45) Date of Patent: Aug. 18, 2015

(54) METHOD FOR CONTROLLING A VEHICLE

(71) Applicant: Ford Global Technologies, LLC, Dearborn, MI (US)

(72) Inventors: Alex O'Connor Gibson, Ann Arbor, MI (US); Michael M. S. Simon, Plymouth, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 13/778,707

(22) Filed: Feb. 27, 2013

(65) Prior Publication Data

US 2014/0243152 A1   Aug. 28, 2014

(51) Int. Cl.
*B60W 10/184*   (2012.01)
*B60W 10/06*   (2006.01)

(52) U.S. Cl.
CPC ............. *B60W 10/184* (2013.01); *B60W 10/06* (2013.01); *Y10T 477/814* (2013.01)

(58) Field of Classification Search
CPC . B60W 10/06; B60W 10/184; B60W 10/188; B60W 30/18118; B60W 30/18109
See application file for complete search history.

(56) References Cited

U.S. PATENT DOCUMENTS

| 5,376,869 | A | 12/1994 | Konrad |
| 6,945,910 | B1 | 9/2005 | Cullen et al. |
| 7,917,275 | B2 | 3/2011 | Doering et al. |
| 8,090,499 | B2 * | 1/2012 | Tamai ............................ 701/38 |
| 8,192,328 | B2 | 6/2012 | Nedorezov et al. |
| 8,370,051 | B2 | 2/2013 | Pursifull et al. |
| 8,403,811 | B2 | 3/2013 | Ulrey et al. |
| 2010/0174459 | A1 | 7/2010 | Gibson et al. |
| 2010/0174460 | A1 | 7/2010 | Gibson et al. |
| 2011/0065548 | A1 * | 3/2011 | Yu et al. ........................ 477/203 |
| 2011/0307157 | A1 | 12/2011 | Pursifull |
| 2012/0010044 | A1 | 1/2012 | Gibson et al. |
| 2012/0010045 | A1 | 1/2012 | Nedorezov et al. |

* cited by examiner

*Primary Examiner* — Huan Le
(74) *Attorney, Agent, or Firm* — Julia Voutyras; Alleman Hall McCoy Russell & Tuttle LLP

(57) ABSTRACT

A method for improving starting of an engine that may be repeatedly stopped and started is presented. In one example, the method adjusts application of vehicle brakes to reduce the possibility of impact between gear teeth after engine starting.

15 Claims, 4 Drawing Sheets

METHOD FOR CONTROLLING A VEHICLE

FIELD

The present description relates to a system for improving vehicle operation. The method may be particularly useful for vehicles that include engines that are often automatically stopped and then restarted.

BACKGROUND AND SUMMARY

An engine of a vehicle may be automatically stopped during select conditions to conserve fuel. The engine may be restarted during other conditions when it is desirable to move the vehicle. Some vehicles that are automatically stopped may include an automatic transmission. The transmission may be in a selected gear at the time the engine is stopped. If the vehicle is stopped on a downhill grade and the engine is automatically restarted while a gear is engaged, the vehicle driveline lash may initially increase, due to an increase in gear tooth to tooth spacing or a loss of tension in a chain drive, due to the negative grade. The increased lash may be taken up suddenly and a tooth to tooth, or chain link, impact load may occur after the engine is restarted. The impact load between gear teeth or within a chain drive may provide an undesirable audible sound as well as gear tooth or chain drive degradation.

The inventors herein have recognized the above-mentioned disadvantages and have developed a method for starting an engine, comprising: automatically starting the engine; and holding a vehicle brake in response to a road grade after a vehicle brake pedal that operates the vehicle brake is released.

By holding vehicle brakes in an applied state in response to a road grade, it may be possible to reduce the possibility of impact loads between gear teeth or within chain drives when the engine is restarted and positive torque is applied to the driveline. For example, if road grade is zero, vehicle brakes may be released when a driver releases a brake pedal. On the other hand, if the road grade is non-zero and negative, the vehicle brakes may be released after engine speed reaches a threshold speed where a torque converter transfers positive torque to the driveline. Holding the vehicle brakes in an applied state limits the possibility of increasing gear lash or reducing chain tension in the driveline.

The present description may provide several advantages. In particular, the approach may reduce audible driveline noise. Additionally, the approach may reduce driveline degradation. Further, the approach may improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
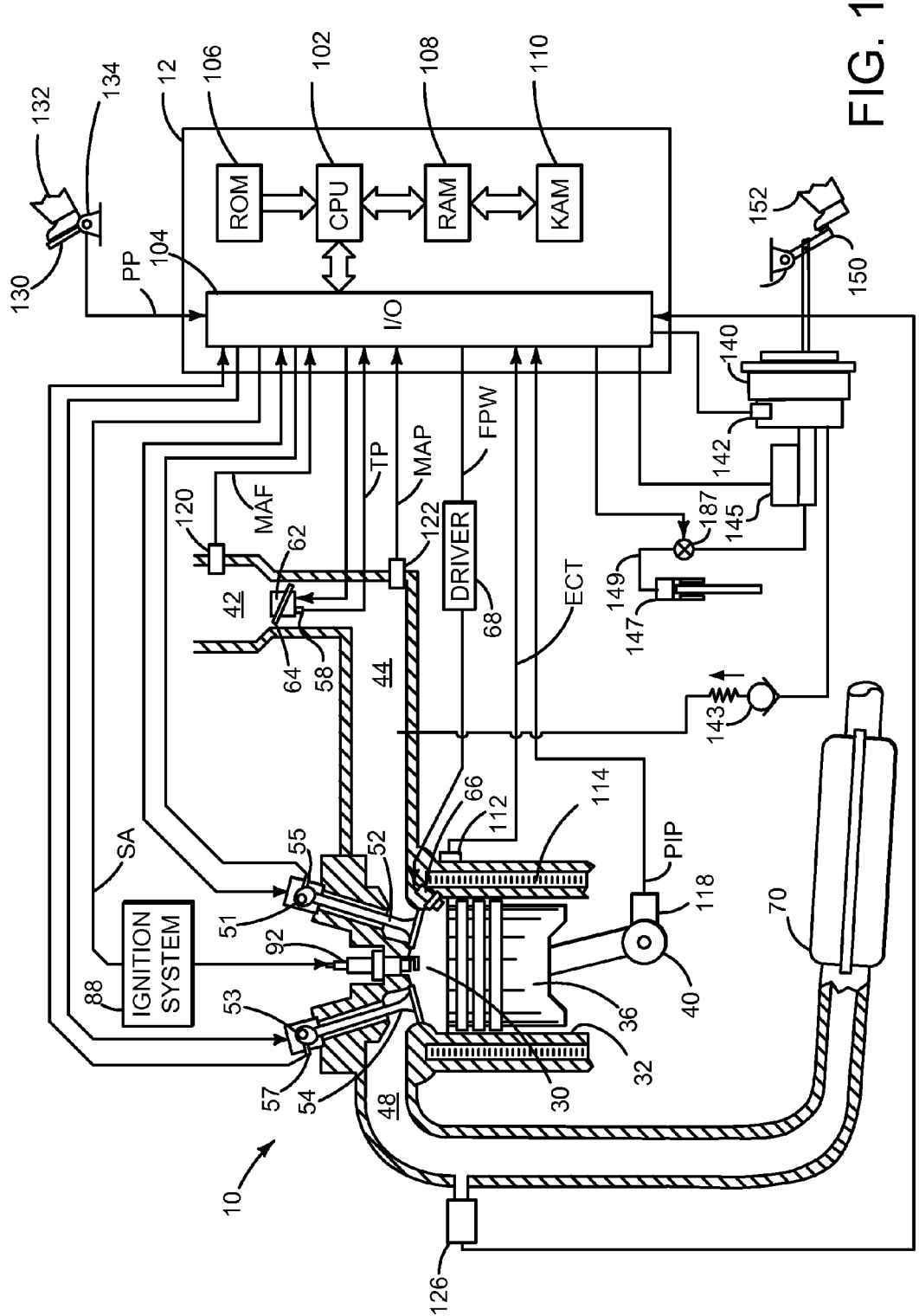
FIG. 1 is a schematic diagram of an engine.
Figure 2:
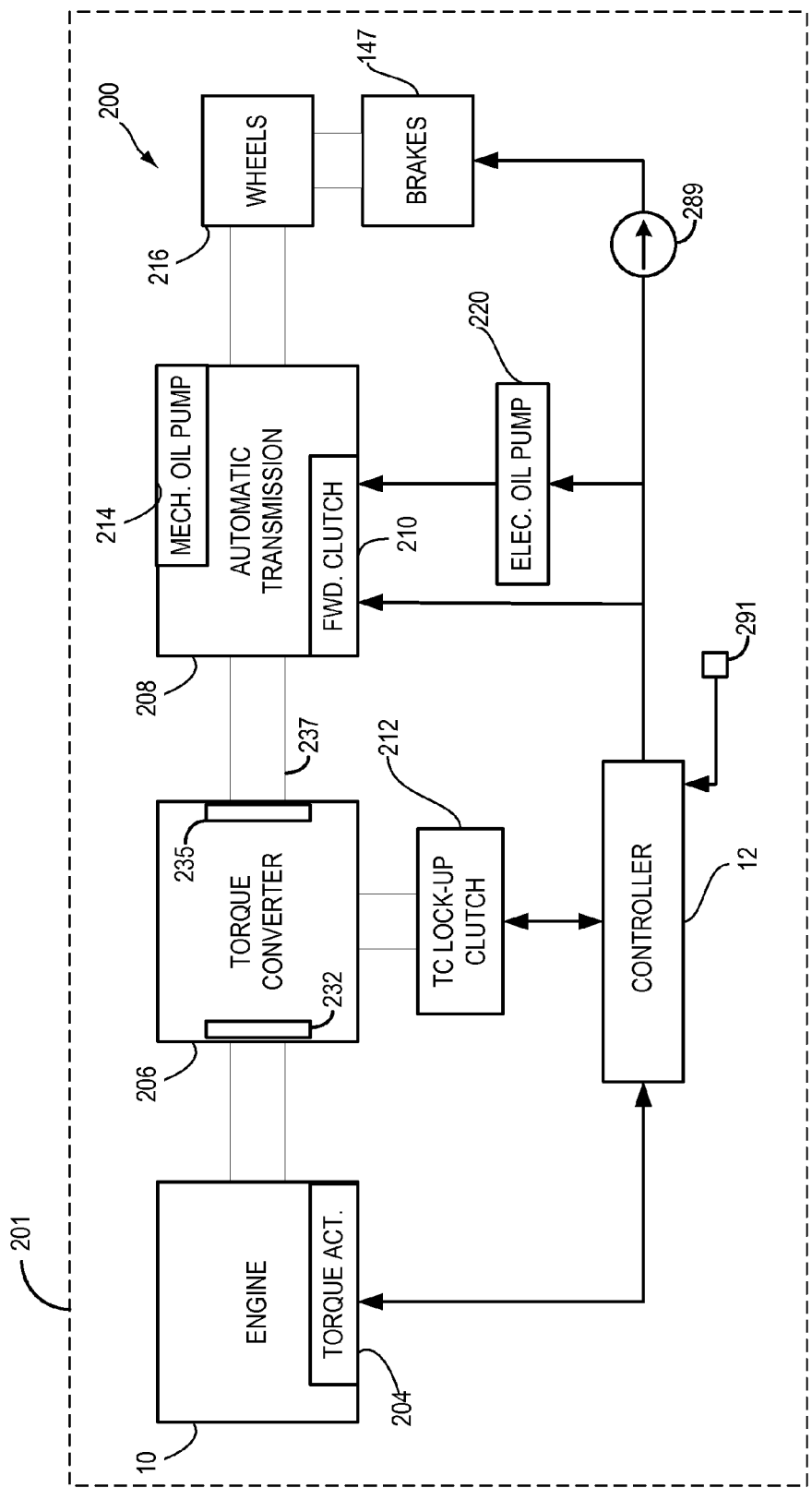
FIG. 2 shows an example vehicle system layout.
Figure 3:
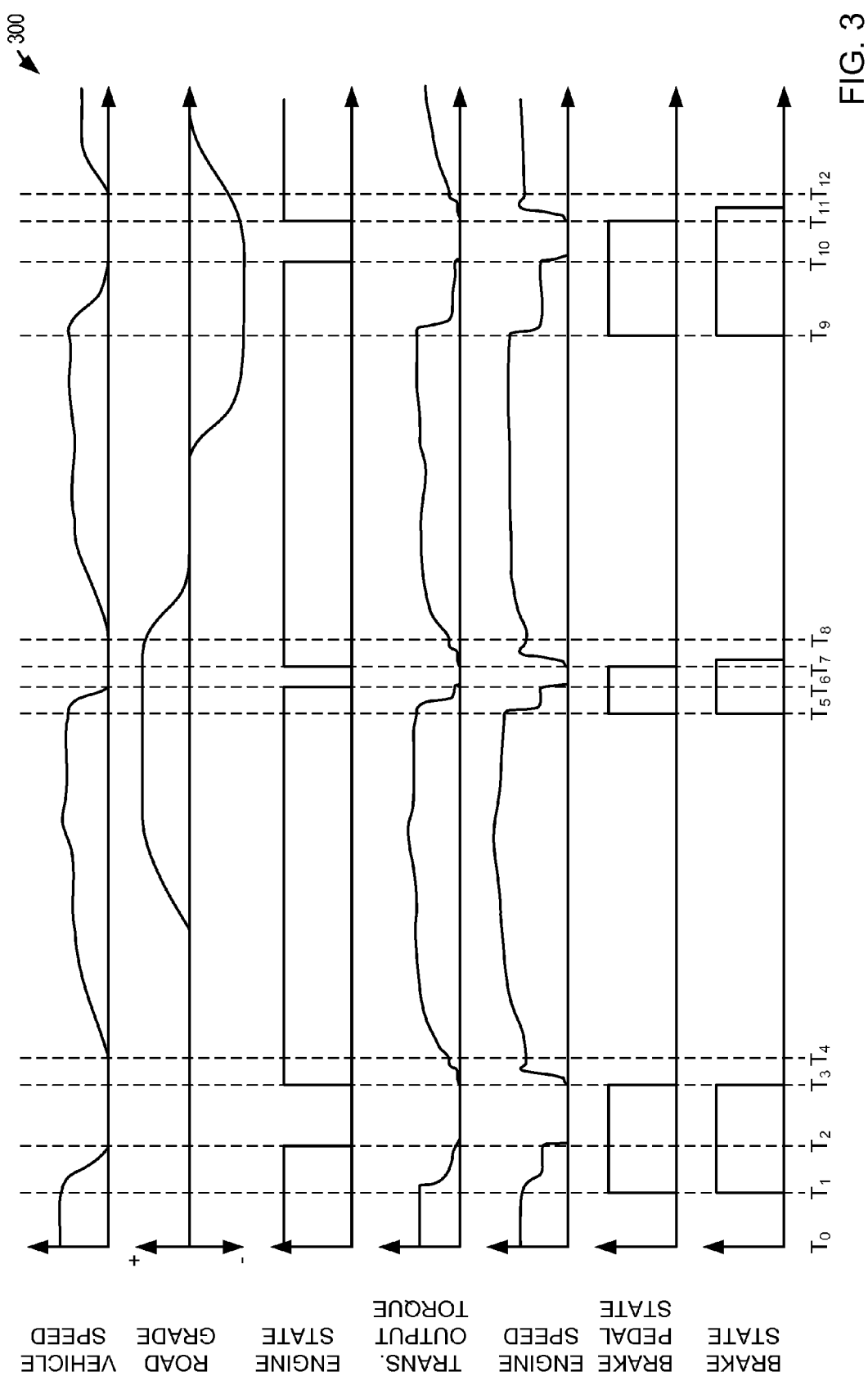
FIG. 3 shows signals of interest during vehicle operation.

The present description is related to controlling operation of a vehicle. In one non-limiting example, the vehicle may include an engine as illustrated in FIG. 1. Further, the engine may be part of a vehicle as illustrated in FIG. 2. The vehicle may operate according to the method of FIG. 4 and as shown in FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Vehicle brakes 147 may be supplied pressurized oil in brake line 149 from master cylinder 145. Brake booster 140 assists operator foot 152 applying brake pedal 150 to operate brakes 147. Vacuum in brake booster 140 may be sensed via vacuum sensor 142. Check valve 143 allows air to flow from brake booster 140 to intake manifold 44. Check valve 143 limits air flow from intake manifold 44 to brake booster 140.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows a vehicle 201 and a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208. Torque converter 206 includes impeller 232 and turbine 235. Further, one or more clutches may be engaged, including forward clutch 210, to propel a vehicle. In one example, the torque converter may be referred to as a component of the transmission. Further, transmission 208 may include a plurality of gear clutches that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle. Specifically, automatic transmission 208 may transfer an input driving torque at the input shaft 237 responsive to a vehicle traveling condition before transmitting an output driving torque to the wheels.

Further, a frictional force may be applied to wheels 216 by engaging wheel brakes 147. In one example, wheel brakes 147 may be engaged in response to the driver pressing his foot on a brake pedal 150 shown in FIG. 1. In the same way, a frictional force may be reduced to wheels 216 by disengaging wheel brakes 147 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Further, controller 12 may receive an estimate of road grade from inclinometer 291.

When idle-stop conditions are satisfied, controller 42 may initiate engine shutdown by shutting off fuel and spark to the engine. In one example, the engine may be stopped in response to a vehicle speed of zero and depression of a vehicle brake pedal. During other conditions the engine may be stopped while the vehicle is presently moving. For example, the engine may be stopped when the engine torque demand is less than a threshold torque.

A wheel brake pressure may also be adjusted during the engine shutdown, based on road grade, engine speed, a driveline torque, or time since engine start. In one example, oil pressure supplied to brakes 147 is adjusted via varying output of pump 289. Alternatively, brake line oil pressure may be relieved via valve 187 after brakes are applied via brake pedal 150 shown in FIG. 1.

When restart conditions are satisfied, and/or a vehicle operator wants to launch the vehicle, controller 12 may reactivate the engine by resuming cylinder combustion. Transmission 208 may be unlocked and the wheel brakes 147 may be released, to return torque to the driving wheels 216. A clutch pressure may be adjusted to unlock the transmission, while a wheel brake pressure may be adjusted to coordinate the release of the brakes with the unlocking of the transmission, and a launch of the vehicle.

Thus, the system of FIGS. 1 and 2 provide for a system for a vehicle, comprising: an engine; a brake pedal; vehicle brakes; a vehicle brake pedal; a transmission; and a controller including executable instructions stored in non-transitory memory for releasing the vehicle brakes in response to an engine condition. The system includes where the engine condition is an engine speed, and where the vehicle brakes are released after the vehicle brake pedal is released. The system includes where the engine speed is a speed at which a torque converter of the transmission transfers more than a threshold amount of engine torque. The system further comprises additional instructions for adjusting an amount of engine torque in response to a road grade. The system includes where the engine condition is an engine speed, and further comprising additional instructions for adjusting an engine speed at which the vehicle brakes are released based on a road grade. The system includes where the engine speed at which the vehicle brakes are released is increased for an increase in a positive road grade.

Figure 4:
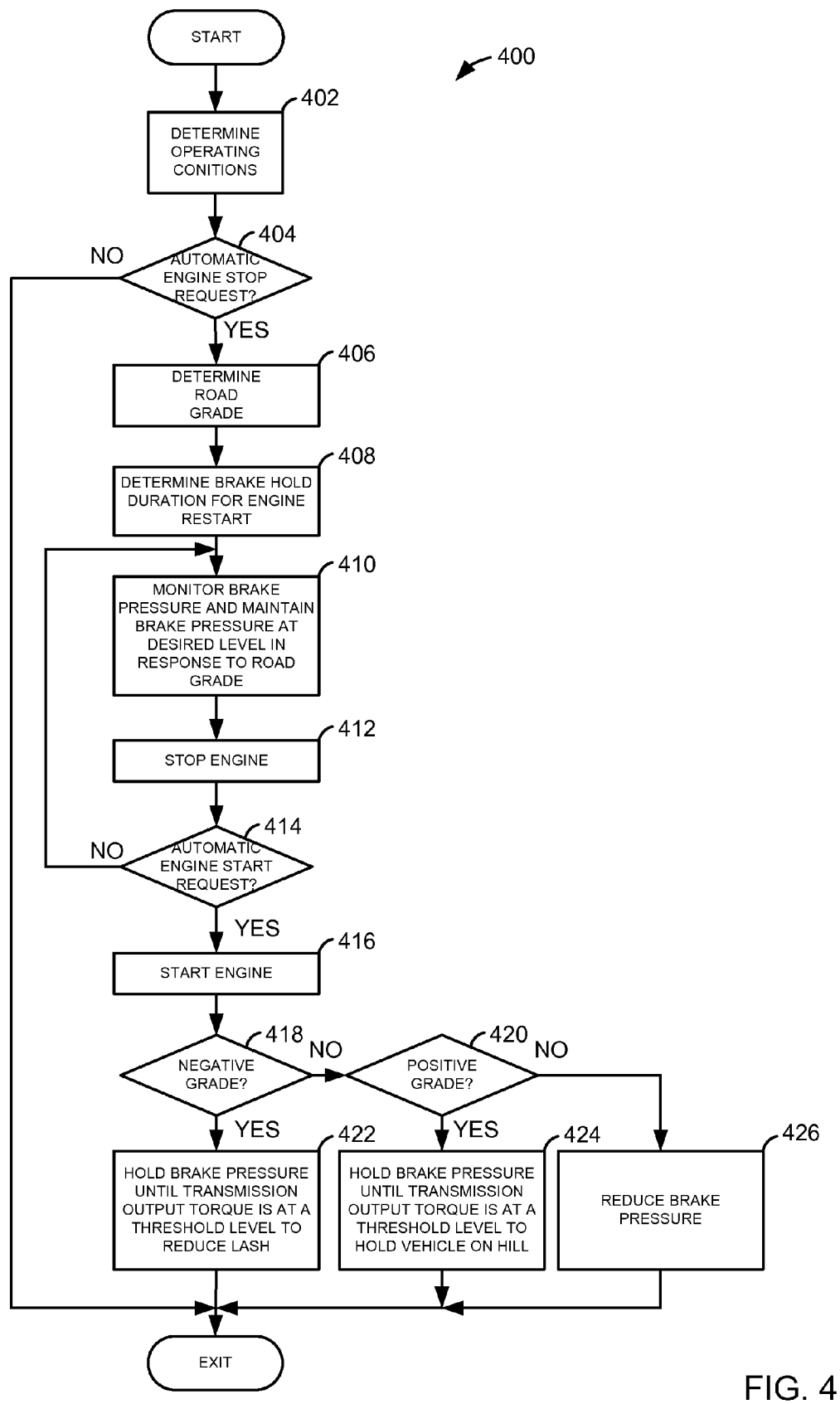
FIG. 4 is a flowchart of an example method for controlling a vehicle.

Referring to FIG. 3, an example plot of a simulated vehicle operating sequence according to the method of FIG. 4 is shown.

The first plot from the top of FIG. 3 represents vehicle speed versus time. The X axis represents time and time increases from the left hand side of the plot to the right hand side of the plot. The Y axis represents vehicle speed and vehicle speed increases in the direction of the Y axis arrow.

The second plot from the top of FIG. 3 represents road grade versus time. The X axis represents time and time increases from the left hand side of the plot to the right hand side of the plot. The Y axis represents road grade and road grade is positive (e.g., uphill) above the X axis and negative (e.g., downhill) below the X axis. Road grade increases as road grade moves away from the X axis in the direction of the Y axis arrows. Positive road grade is indicated by + and negative road is indicated by −.

The third plot from the top of FIG. 3 represents engine state versus time. The X axis represents time and time increases from the left hand side of the plot to the right hand side of the plot. The Y axis represents engine state and the engine is operating when the engine state is at a higher level. The engine is stopped when the engine state trace is at a lower level.

The fourth plot from the top of FIG. 3 represents transmission output torque versus time. The X axis represents time and time increases from the left hand side of the plot to the right hand side of the plot. The Y axis represents transmission output torque and transmission output torque increases in the direction of the Y axis arrow.

The fifth plot from the top of FIG. 3 represents engine speed versus time. The X axis represents time and time increases from the left hand side of the plot to the right hand side of the plot. The Y axis represents engine speed and engine speed increases in the direction of the Y axis arrow.

The sixth plot from the top of FIG. 3 represents vehicle brake pedal state versus time. The X axis represents time and time increases from the left hand side of the plot to the right hand side of the plot. The Y axis represents vehicle brake pedal state and the vehicle brake pedal is applied when the vehicle brake pedal state trace is at a higher level. The vehicle brake pedal is not applied when the vehicle brake pedal state is at a lower level.

The seventh plot from the top of FIG. 3 represents vehicle brake state versus time. The X axis represents time and time increases from the left hand side of the plot to the right hand side of the plot. The Y axis represents vehicle brake pedal state and the vehicle brake pedal is applied when the vehicle brake state trace is at a higher level. The vehicle brake is not applied when the vehicle brake state is at a lower level.

At time $T_0$, the vehicle is moving and the road grade is zero. The engine is also running and the transmission is outputting torque to propel the vehicle. The brake pedal and brakes are not applied. Thus, the vehicle is traveling at a moderate speed.

At time $T_1$, the driver demand torque is decreased in response to an operator releasing an accelerator pedal (not shown). The engine speed, vehicle speed, and transmission output torque decrease in response to the reduction in driver demand torque. The engine continues to run and the road grade remains at zero. The driver also depresses the brake pedal so as to reduce the vehicle speed. The vehicle brakes are applied in response to the driver depressing the brake pedal as indicted by the brake pedal state and brake states transitioning to higher levels.

At time $T_2$, the vehicle speed reaches zero and the engine is automatically stopped (e.g., stopped without driver input to a device that has a sole purpose of stopping and/or starting the engine). The engine is stopped in response to vehicle speed being zero and the brake pedal being depressed. The engine state and engine speed transition to lower levels when the engine is stopped. The transmission output torque also goes to zero since the engine is stopped. The brake pedal and brakes continue to be applied.

At time $T_3$, the vehicle brake pedal is released by the driver and the vehicle brakes are released when the driver releases the vehicle brake pedal. The engine is also restarted in response to the driver releasing the brake pedal. The road grade is zero so the vehicle brakes are released as the driver releases the brake pedal because there is not a negative grade to induce lash in the driveline gears and since the grade is not positive which may have caused the vehicle to roll downhill. The transmission output torque increases as engine speed increases and torque is transferred from the engine to the transmission.

At time $T_5$, the vehicle speed begins to increase in response to the increasing transmission output torque. The engine continues to operate as indicated by the engine state staying at a high level. The engine speed increases as the driver increases the driver demand torque (not shown). The road grade remains at zero and the brake pedal and brakes are not applied.

Between time $T_4$ and time $T_5$, the road grade increases in a positive direction and the engine and vehicle continues to operate. The transmission also continues to output torque from the engine and the brake pedal and brakes are not activated.

At time $T_5$, the driver demand torque is decreased in response to an operator releasing an accelerator pedal (not shown). The engine speed, vehicle speed, and transmission output torque decrease in response to the reduction in driver demand torque. The engine continues to operate and the road grade remains at a higher positive value. The driver also depresses the brake pedal so as to reduce the vehicle speed. The vehicle brakes are applied in response to the driver depressing the brake pedal as indicted by the brake pedal state and brake states transitioning to higher levels.

At time $T_6$, the vehicle speed reaches zero and the engine is automatically stopped. The engine is stopped in response to vehicle speed being zero and the brake pedal being depressed. The engine state and engine speed transition to lower levels when the engine is stopped. The transmission output torque also goes to zero since the engine is stopped. The brake pedal and brakes continue to be applied. The road grade is estimated to determine whether or not the vehicle brakes are to be controlled in response to the road grade.

At time $T_7$, the vehicle brake pedal is released by the driver and the vehicle brakes remain in an applied state. The vehicle brakes may remain applied via limiting a reduction in brake line pressure via a valve. Alternatively, a pump may be used to hold brake pressure at an elevated level. The engine is also restarted in response to the driver releasing the brake pedal. The road grade is positive and non-zero so the vehicle brakes remain engaged until selected conditions occur. The vehicle remains stationary on the positive grade.

Between time $T_7$ and time $T_8$, the brakes are released. The brakes may be released during selected conditions that may include engine speed exceeding a threshold engine speed. By delaying brake release until engine speed reaches a threshold speed allows the torque converter to output a positive torque so that the vehicle wheels may not move until driveline torque is sufficient to move the vehicle in a forward direction. Additionally, the engine speed threshold at which the brakes are released may vary with positive road grade. For example, if the vehicle is stopped on a low grade, the brakes may be released at a first lower engine speed. If the vehicle is stopped on a higher grade, the brakes may be released at a second higher engine speed. In another example, the brakes may be released when a driveline torque amount is a threshold torque amount. For example, brakes may be released when torque at a torque converter turbine is greater than a threshold torque, and where the threshold torque is varied with road grade. For example, the threshold torque increases with increasing road grade (e.g, moving away from zero grade). The threshold torque decreases with decreasing road grade (e.g., moving toward zero grade). In other examples, the brakes may be released after a threshold amount of time after an engine stop.

At time $T_8$, the vehicle speed begins to increase in response to the increasing transmission output torque. The engine continues to operate as indicated by the engine state staying at a high level. The engine speed increases as the driver increases the driver demand torque (not shown). The road grade begins to decrease toward zero and the brake pedal and brakes are not applied.

Between time $T_8$ and time $T_9$, the road grade decreases and changes from a positive grade to a negative grade. The transmission also continues to output torque from the engine and the brake pedal and brakes are not activated.

At time $T_9$, the driver demand torque is decreased in response to an operator releasing an accelerator pedal (not shown). The engine speed, vehicle speed, and transmission output torque decrease in response to the reduction in driver demand torque. The engine continues to operate and the road grade is at a more negative value. The driver also depresses the brake pedal so as to reduce the vehicle speed. The vehicle brakes are applied in response to the driver depressing the brake pedal as indicted by the brake pedal state and brake states transitioning to higher levels.

At time $T_{10}$, the vehicle speed reaches zero and the engine is automatically stopped. The engine is stopped in response to vehicle speed being zero and the brake pedal being depressed. The engine state and engine speed transition to lower levels when the engine is stopped. The transmission output torque also goes to zero since the engine is stopped. The brake pedal and brakes continue to be applied. The road grade is estimated to determine whether or not the vehicle brakes are to be controlled in response to the road grade.

At time $T_{11}$, the vehicle brake pedal is released by the driver and the vehicle brakes remain in an applied state. The vehicle brakes may remain applied via limiting a reduction in brake line oil pressure via a valve. Alternatively, a pump may be used to hold brake oil pressure at an elevated level. The engine is also restarted in response to the driver releasing the brake pedal. The road grade is negative and non-zero so the vehicle brakes remain engaged until selected conditions occur. However, if the brakes were not applied, lash may develop between gears, or the tension may be reduced in a chain drive, in the driveline. By applying the brakes the vehicle cannot roll downhill and open space between gear teeth, or reduce tension within a chain drive. The vehicle remains stationary on the positive grade.

Between time $T_{11}$ and time $T_{12}$, the brakes are released. The brakes may be released during selected conditions that may include engine speed exceeding a threshold engine speed. By delaying brake release until engine speed reaches a threshold speed allows the torque converter to output a positive torque so that lash may be limited between gears. Additionally, the engine speed threshold at which the brakes are released may vary with negative road grade. For example, if the vehicle is stopped on a low negative grade, the brakes may be released at a first lower engine speed. If the vehicle is stopped on a higher grade, the brakes may be released at a second higher engine speed. In another example, the brakes may be released when a driveline torque amount is a threshold torque amount. For example, brakes may be released when torque at a torque converter turbine is greater than a threshold torque, and where the threshold torque is varied with road grade. For example, the threshold torque increases with decreasing road grade (e.g., moving toward zero grade). The threshold torque decreases with increasing road grade (e.g., moving toward zero grade). In other examples, the brakes may be released after a threshold amount of time after an engine stop.

At time $T_{12}$, the vehicle speed begins to increase in response to the increasing transmission output torque and road grade. The engine continues to operate as indicated by the engine state staying at a high level. The engine speed increases as the driver increases the driver demand torque (not shown). The road grade begins to decrease toward zero and the brake pedal and brakes are not applied.

Referring now to FIG. 4, a method for operating a vehicle is described. The method of FIG. 4 may be stored as executable instructions in non-transitory memory of controller 12 described in FIGS. 1 and 2. Further, the method of FIG. 4 may provide the operating sequence illustrated in FIG. 3.

At 402, method 400 determines operating conditions. Operating conditions may include but are not limited to engine speed, engine load, vehicle speed, driver demand torque, and engine temperature. Method 400 proceeds to 404 after operating conditions are determined.

At 404, method 400 judges whether or not an automatic engine stop (e.g., an engine stop request without a driver specifically requesting an engine stop via an input that has a sole function of stopping and/or starting the engine). In one example, an automatic engine stop request may be made when vehicle speed is less than a threshold speed while the vehicle brake pedal is depressed. If method 400 judges that an automatic engine stop request has occurred, the answer is yes and method 400 proceeds to 406. Otherwise, the answer is no and method 400 proceeds to exit.

At 406, method 400 determines road grade. In one example, road grade is determined via an inclinometer. In other examples, road grade may be inferred via an accelerometer. Method 400 proceeds to 408 after road grade is determined.

At 408, method 400 determines brake hold duration. In one example, method 400 determines different brake hold durations depending on whether the vehicle is stopped on a positive, negative, or zero grade.

In one example, if the vehicle is stopped on a road having zero grade, the vehicle brake may be released when the driver releases the brake pedal. Alternatively, the brake pedal may be released a predetermined amount of time after the driver releases the brake pedal.

If the vehicle is stopped on a positive grade, method 400 may decide to hold vehicle brakes applied while engine speed is zero and until engine speed reaches and/or crosses a threshold speed. The threshold speed may vary with grade. For example, the threshold engine speed may be increased as road grade increases. By allowing engine speed to reach a threshold speed it may be possible to provide a known amount of torque out of the torque converter since output of a torque converter is speed dependent.

In one example, the threshold engine speed is based on a torque converter stall speed. In another example, the vehicle brakes may be held applied from zero engine speed to a predetermined amount of time after the engine begins to rotate (e.g., time since engine stop). The predetermined amount of time may be varied with road grade. For example, the predetermined amount of time may increase as road grade increases. In still another example, the vehicle brake may be held applied until engine and/or transmission output torques reach threshold levels after engine stop. For example, the vehicle brakes may be held in an applied state after an engine stop until transmission output torque is at least 20 N-m. The threshold engine and/or transmission output torque may vary with road grade. For example, the threshold engine and/or transmission torque may increase as road grade increases. The threshold engine and/or transmission torque may decrease as road grade decreases. In one example, the vehicle brakes are held until transmission output torque is at least:

$$\text{wheel\_tor} = \text{trans\_tor} \cdot N_{FD} = r \cdot m \cdot g \cdot \sin \Theta$$

Where wheel_tor is the driven wheel torque, trans_tor is transmission output torque, $N_{FD}$ is the final drive gear ratio, r is wheel radius, m is vehicle mass, g is coefficient of gravity, and sin $\Theta$ is sine of the road angle (e.g., related to grade).

The engine and transmission output torques may be inferred based on engine speed, engine load, transmission impeller speed, transmission turbine speed, and presently selected transmission gear. For example, engine torque may be empirically determined and stored in memory that is indexed according to engine speed and load. The estimated engine torque is input to a known torque converter model and the torque converter model outputs a torque that is multiplied by the present gear ratio to provide an estimated transmission output torque.

Similarly, if the vehicle is stopped on a negative grade, method 400 may decide to hold vehicle brakes applied while engine speed is zero and until engine speed reaches and/or crosses a threshold speed. The threshold speed may vary with grade. For example, the threshold engine speed may be decreased as negative road grade increases. By allowing engine speed to reach a threshold speed it may be possible to provide a known amount of torque out of the torque converter to reduce the possibility of driveline gear lash since output of a torque converter is speed dependent.

In one example, the threshold engine speed is based on a torque converter stall speed. In another example, the vehicle brakes may be held applied from zero engine speed to a predetermined amount of time after the engine begins to rotate (e.g., time since engine stop). The predetermined amount of time may be varied with road grade. For example, the predetermined amount of time may increase as negative road grade increases (e.g., moves away from zero road grade). In still another example, the vehicle brake may be held applied until engine and/or transmission output torques are reach threshold levels after engine stop. For example, the vehicle brakes may be held in an applied state after an engine stop until transmission output torque is at least 10 N-m so that positive torque is applied to the driveline to reduce the possibility of lash if the vehicle begins to roll after engine starting. The threshold engine and/or transmission output torque may vary with negative road grade. For example, the threshold engine and/or transmission torque may increase as negative road grade increases. The threshold engine and/or transmission torque may decrease as negative road grade decreases. The engine and transmission output torques may be inferred based on engine speed, engine load, transmission impeller speed, transmission turbine speed, and presently selected transmission gear. Method 400 proceeds to 410 after the brake hold duration is determined.

At 410, method 400 monitors brake pressure and maintains brake pressure in response to road grade. In one example, brake line oil pressure is monitored as the driver applies the brakes and the vehicle is stopped. If method 400 judges that the vehicle brakes will be held applied after the driver releases the brake pedal, a valve may limit oil flow out of brake actuators to maintain brake pressure. In other examples, a pump may hold oil pressure at a level used by the driver to stop the vehicle. In still other examples, the pump output pressure may be adjusted based on road grade. For example, if road grade increases, pump pressure may be increased to hold the vehicle on the hill. In other examples, where the vehicle is stopped on zero grade, the brake line oil pressure may simply follow the driver's input to the brake pedal. Method 400 proceeds to 412 after brake pressure is adjusted.

At 412, method 400 stops the engine. The engine may be stopped via stopping fuel flow and/or spark to the engine. Method 400 proceeds to 414 after commanding the engine to stop.

At 414, method 400 judges whether or not there is a request to automatically restart the engine. The engine may be automatically restarted in response to the driver releasing a brake pedal or some other condition. If method 400 judges that the engine is to be automatically restarted, the answer is yes and method 400 proceeds to 416. Otherwise, the answer is no and method 400 returns to 410.

At 416, the engine is automatically started. The engine may be automatically restarted via engaging a starter and supplying spark and fuel to the engine. Method 400 proceeds to 418 after the engine begins rotating to start.

At 418, method 400 judges whether or not the road grade is negative. In one example, method 400 may judge that the road grade is negative based on output of the inclinometer. If the road grade is negative, the answer is yes and method 400 proceeds to 422. Otherwise, the answer is no and method 400 proceeds to 420.

At 422, method 400 holds the vehicle brakes in an applied state for the duration determined at 408. Since the vehicle is stopped on a negative grade, it may have a tendency to want to roll forward and produce lash between gears, or reduce the tension in a chain drive; however, little driveline torque may be required to propel the vehicle down the hill. Consequently, the amount of positive torque applied to the driveline to reduce lash may be less than the amount of positive torque applied to the driveline when the road grade is positive. Method 400 proceeds to exit after the desired amount of positive torque is applied to the driveline.

At 420, method 400 judges whether or not the road grade is positive. In one example, method 400 may judge that the road grade is positive based on output of the inclinometer. If the road grade is positive, the answer is yes and method 400 proceeds to 424. Otherwise, the answer is no and method 400 proceeds to 426.

At 424, method 400 holds the vehicle brakes in an applied state for the duration determined at 408. Since the vehicle is stopped on a positive grade, it may have a tendency to want to roll backward. The vehicle position may be maintained via holding the brakes in an applied state until the transmission torque output is equal or greater than the force of gravity working with the hill. Consequently, the amount of positive torque applied to the driveline to hold the vehicle in place or move up the hill may be more than the amount of positive torque applied to the driveline when the road grade is negative. Method 400 proceeds to exit after the desired amount of positive torque is applied to the driveline.

At 426, method 400 reduces brake pressure at the same time the driver releases the brake. Alternatively, the brake pressure may be reduced a predetermined amount of time after the driver releases the brake. By reducing brake pressure, the brakes may be released. Method 400 proceeds to exit after the brakes are released.

In this way, vehicle brakes may be operated during automatic engine starting to reduce the possibility of creating lash between gears, or a loss of chain drive tension, when a vehicle is stopped on a negative grade. Further, vehicle brakes may be held in an applied state when an engine is automatically restarted while the vehicle is stopped on a positive grade to reduce vehicle motion.

Thus, the method of FIG. 4 provides for starting an engine, comprising: automatically starting the engine; and holding a vehicle brake in response to a road grade after a vehicle brake pedal that operates the vehicle brake is released. The method includes where a duration that the vehicle brake is held is based on a road grade. The method further comprises automatically stopping the engine before automatically starting the engine. The method includes where holding the vehicle brake includes maintaining a brake oil pressure. The method includes where the duration that the vehicle brake is held is based on an engine speed. The method includes where the duration that the vehicle brake is held is based on an amount of driveline torque produced via the engine after starting the engine. The method also includes where the duration that the vehicle brake is held is based on a time since engine speed exceeds a threshold speed.

In another example, the method of FIG. 4 provides for starting an engine, comprising: automatically starting the engine; and holding a vehicle brake in response to a driveline torque after a vehicle brake pedal that operates the vehicle brake is released. The method includes where the driveline torque is a driveline torque level that varies with road grade. The method includes where the driveline torque is a driveline torque level that varies depending on positive or negative road grade. The method includes where the driveline torque level increases at a greater rate for a positive road grade than for a negative road grade. The method further comprises holding the vehicle brake with a pressure based on input from the vehicle brake pedal. The method includes where the pressure based on input from the vehicle brake pedal is a pressure that develops in a brake line while the vehicle brake pedal is applied. The method further comprises automatically stopping the engine before automatically starting the engine.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for starting the engine, comprising:
   automatically starting an engine; and
   holding a vehicle brake in response to a road grade after a vehicle brake pedal that operates the vehicle brake is released, where a duration that the vehicle brake is held is based on a time since engine speed exceeds a threshold speed.

2. The method of claim 1, where the duration that the vehicle brake is held is further based on the road grade.

3. The method of claim 1, further comprising automatically stopping the engine before automatically starting the engine.

4. The method of claim 1, where holding the vehicle brake includes maintaining a brake oil pressure.

5. The method of claim 1, where the duration that the vehicle brake is held is further based on the engine speed.

6. The method of claim 1, where the duration that the vehicle brake is held is further based on an amount of driveline torque produced via the engine after starting the engine.

7. A method for starting an engine, comprising:
   automatically starting the engine;
   holding a vehicle brake in response to a driveline torque after a vehicle brake pedal that operates the vehicle brake is released; and
   holding the vehicle brake with a pressure based on input from the vehicle brake pedal, where the pressure based on input from the vehicle brake pedal is a pressure that develops in a brake line while the vehicle brake pedal is applied.

8. The method of claim 7, where the driveline torque is a driveline torque level that varies with road grade.

9. The method of claim 7, further comprising automatically stopping the engine before automatically starting the engine.

10. The method of claim 7, where the driveline torque is a driveline torque level that varies depending on positive or negative road grade.

11. The method of claim 10, where the driveline torque level increases at a greater rate for the positive road grade than for the negative road grade.

12. A system for a vehicle, comprising:
an engine;
vehicle brakes;
a vehicle brake pedal;
a transmission; and
a controller including executable instructions stored in non-transitory memory for releasing the vehicle brakes in response to an engine condition, where the engine condition is an engine speed, where the vehicle brakes are released after the vehicle brake pedal is released, and where the engine speed is a speed at which a torque converter of the transmission transfers more than a threshold amount of engine torque.

13. The system of claim 12, further comprising additional instructions for adjusting an amount of engine torque in response to a road grade.

14. The system of claim 12, where the engine condition is an engine speed, and further comprising additional instructions for adjusting an engine speed at which the vehicle brakes are released based on a road grade.

15. The system of claim 14, where the engine speed at which the vehicle brakes are released is increased for an increase in a positive road grade.

* * * * *